BASE-SHEET OF RECORD MATERIAL COATED ON THE REAR WITH MINUTE PRESSURE-RUPTURABLE CAPSULES CONTAINING LIQUID SOLUTION OF CHROMOGENIC MATERIAL DEVELOPABLE ON CONTACT WITH AN ELECTRON-ACCEPTING MATERIAL OF THE LEWIS-ACID TYPE TO COLORED FORM

RECEIVING SURFACE OF UNDERSHEET COATED WITH AN ELECTRON-ACCEPTING MATERIAL OF THE LEWIS-ACID TYPE

United States Patent Office 3,703,397
Patented Nov. 21, 1972

3,703,397
MARK-FORMING RECORD MATERIALS AND
PROCESS FOR THEIR USE
Chao-Han Lin, Dayton, and Arthur J. Wright, Cincinnati, Ohio, assignors to The National Cash Register Company, Dayton, Ohio
Original application Jan. 21, 1969, Ser. No. 792,280, now Patent No. 3,594,369, dated July 20, 1971. Divided and this application Oct. 30, 1970, Ser. No. 85,754
Int. Cl. B61m 5/22
U.S. Cl. 117—36.2
15 Claims

ABSTRACT OF THE DISCLOSURE

A novel chromogenic material of normally colorless form is disclosed, having a structural formula:

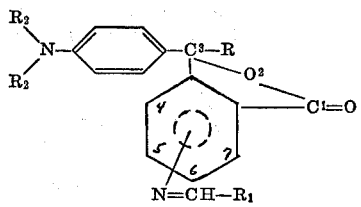

wherein R comprises 1,2-dimethylindol-3-yl and p-dialkylaminophenyl radicals; $R_1$ comprises substituted and unsubstituted aromatic and heterocyclic-aromatic radicals; and $R_2$ comprises hydrogen and alkyl radicals having less than five carbon atoms—said material assuming a colored form upon reactive contact with a Lewis acid molecule. Examples include 6-(p-dimethylaminobenzylidene)amino-3-(p-dimethylaminophenyl)-3-(1,2 - dimethylindol-3-yl)phthalide; 5 - (p-dimethylaminobenzylidene) amino-3-(p-dimethylaminophenyl)-3-(1,2 - dimethylindol-3-yl)phthalide; 6-(benzylidene)amino-3,3-bis(p-dimethylaminophenyl)phthalide; 5-(p-dimethylaminobenzylidene) amino-3,3-bis(p-dimethylaminophenyl)phthalide; 6-(cinnamylidene)amino-3-(p-dimethylaminophenyl - 3 - (1,2-dimethylindol-3-yl)phthalide.

This is a division of application Ser. No. 792,280, filed Jan. 21, 1969, now U.S. Pat. No. 3,594,369.

BACKGROUND OF THE INVENTION

This invention pertains to novel chromogenic compounds for use in pressure sensitive record material and to an improved mark-forming manifold system incorporating these novel chromogenic compounds. More specifically, this invention pertains to indolyl- and phenyl-substituted nitro- and amino-substituted dialkylaminophthalide-Schiff bases which have the form of substantially colorless, i.e. white, or slightly colored solids, or approach being colorless when in liquid solution, but which may be converted to dark-colored forms upon reactive contact with appropriate acidic material. As used in mark-forming systems, marking in desired areas on support webs or sheets may be accomplished by effecting localized reactive contact between the novel chromogenic material and the acidic material on or in such a web or sheet, such material being brought thereto by transfer, or originally there, in situ—the desired reactive contact forming dark-colored materials in the intended image areas.

This invention further relates to such novel chromogenic compounds wherein separate and individual chemical groups resident in the molecular structure of the novel chromogenic compounds each contribute to the final color state of the chromogenic compounds when they are reacted with a Lewis acid material. The novel chromogenic compounds of the present invention are Schiff bases derived from reaction of an aromatic or aliphatic aldehyde with an amine-containing, parent, lactone compound. On reactive contact with a Lewis acid, the Schiff base contributes one color and the parent lactone compound contributes another color—the optical sum of the contributions resulting in a single hue taken, in this case, to be the final color state of the novel chromogenic compound. Certain preferred ones of the novel Schiff base chromogenic compounds have been found to react with some Lewis acid materials to result in a single neutral-colored, i.e., gray to black, reaction product. Such neutral-colored reaction products find particular use in pressure-sensitive, mark-forming recording systems by virtue of their having improved stability on exposure to light and improved reproduction capabilities when copied by xerographic or diazo processes.

Pressure-sensitive, mark-forming systems of the prior art include that disclosed in application for Letters Patent No. 392,404, filed Aug. 27, 1964, now abandoned, in the names of Robert E. Miller and Paul S. Phillips, Jr. The above-mentioned patent application provides a marking system of disposing on and/or within sheet support material, mutually reactant but unreacted mark-forming components (at least one component of which is a polymeric material) and a liquid solvent in which each of the mark-forming components is soluble—said liquid solvent being present in such form that it is maintained isolated by a pressure-rupturable barrier from at least one of the mark-forming components until an application of pressure causes a breach or rupture of the barrier in the area delineated by the pressure pattern. The mark-forming components thereby are brought into reactive contact, producing a distinctive mark.

It is an object of this invention to provide new and improved substances having chromogenic properties which may be incorporated in a web or coated onto the surface of a web to provide a novel manifolding unit, and which are, moreover, useful in carrying out improved methods of marking involving reactive contact with a color-activating material to yield dark-colored reaction products in areas where marking is desired.

It is another object of this invention to provide compounds, based upon the indolyl- and phenyl-substituted aminophthalide-Schiff bases disclosed herein which are substantially colorless, or slightly colored offering a new and improved variety of chromogenic characteristics, and yielding novel dark-colored substances upon contact with color-activating materials.

It is a further object of this invention to provide new and improved, normally substantially colorless, chromogenic substances yielding Lewis acid-reacted color products which exhibit improved color stability on exposure to light and improved reproduction capabilities when copied by xerographic or diazo processes.

It is a further object of this invention to provide new and improved, normally substantially colorless, chromogenic substances yielding colored reaction products when placed in reactive contact with certain selected Lewis acid materials.

It is a further object of this invention to provide new and improved, normally substantially colorless, chromogenic substances yielding neutral colored, i.e., gray to black, reaction products when placed in reactive contact with certain selected Lewis acid materials.

It is a further object of this invention to provide a new and improved mark-forming system which comprises disposing, within a web or upon the surface of a web or sheet-support-material, unreacted chromogenic material in a location suitable for subsequent reactive contact with an acidic material to produce dark-colored reaction products, thus providing means for making marks of desirable color intensity and hue.

In accordance with one feature of this invention, there is provided a novel, substantially colorless or slightly colored, chromogenic compound having the structural formula:

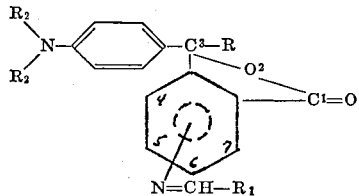

wherein R comprises 1,2-dimethylindol-3-yl and p-dialkylaminophenyl radicals; $R_1$ comprises substituted and unsubstituted aromatic and heterocyclic-aromatic radicals; and $R_2$ comprises hydrogen and alkyl radicals having less than five carbon atoms. Examples of these novel compounds include 6-(p-dimethylaminobenzylidene)amino-3-(p-dimethylaminophenyl) - 3 - (1,2-dimethylindol-3-yl) phthalide having the structural formula:

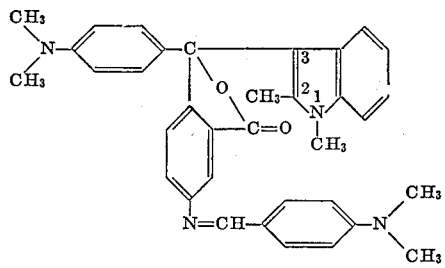

6 - (benzylidene)amino-3,3-bis(p-dimethylaminophenyl) phthalide having the structural formula:

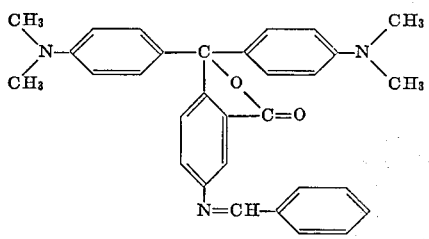

5 - (p-dimethylaminobenzylidene)amino-3,3-bis(p-dimethylaminophenyl)phthalide having the structural formula:

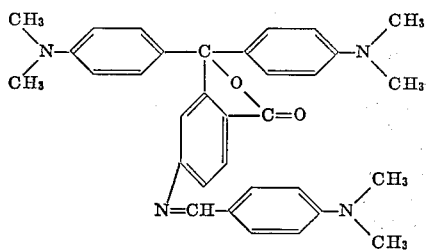

6 - (cinnamylidene)amino-3-(p-dimethylaminophenyl)-3-(1,2-dimethylindol-3-yl)phthalide having the structural formula:

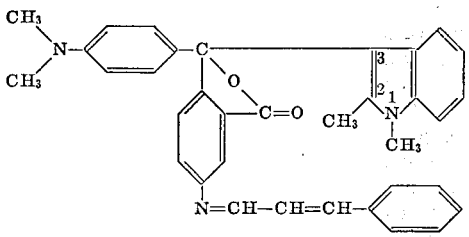

3 - (p-dimethylaminophenyl)-3-(1,2-dimethylindol-3-yl)-6-(1-naphthylmethylene)aminophthalide having the structural formula:

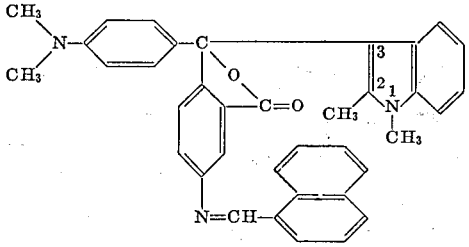

3-(p-dimethylaminophenyl) - 6 - (3-indolylmethylene) amino-3-(1,2-dimethylindol - 3 - yl)phthalide having the structural formula:

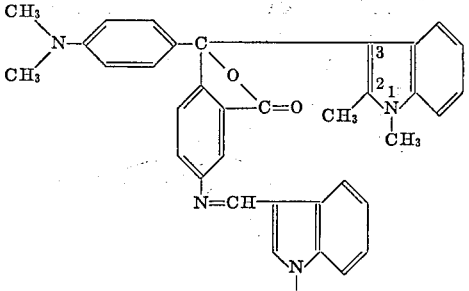

3,3-bis(p-dimethylaminophenyl) - 6 - [(1,3,3-trimethyl-2-indolinylidene) ethylideneamino]phthalide having the structural formula:

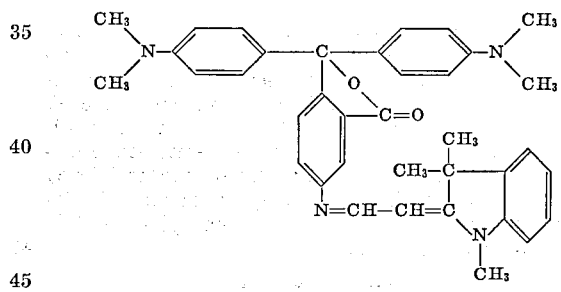

In accordance with another feature of this invention, a new composition of matter is disclosed which comprises a dark-colored product of chemical reaction having a resonant chemical structure and produced by contact of a color-activating material with one of the above-mentioned chromogenic compounds. The color-developing or activating material is an acidic substance useful for converting the chromogenic compounds to colored forms.

The method of marking of this invention, i.e., the method of developing a dark-colored material from substantially colorless or slightly colored chromogenic compounds, comprises providing a chromogenic compound selected from among the above-mentioned compounds and bringing such chromogenic compound into reactive contact with an acidic color-activating substance, in areas where marking is desired, to produce a dark-colored form of the chromogenic compound by the action thereon of said acidic substance.

Acidic materials employed in this invention can be any compound within the definition of a Lewis acid, i.e., any electron acceptor. Preferably, acidic organic polymers such as phenolic polymers are employed as the acidic material. The novel chromogenic materials exhibit the advantage of improved color stability when they are reacted with such phenolic polymers. Solution formation of solid particles of the polymeric material in a solvent system with the substantially colorless chromogenic compounds permits penetration of the dark-colored reaction product into a porous support sheet, e.g., paper, so that the colored form of the chromogenic material is absorbed into the body of the sheet and is not merely on the surface of the sheet. The absorption feature provides protection against erasure of recorded data by attrition of the surface of a record sheet made in accordance with the present invention.

Preferred chromogenic materials of this invention are those which yield, as the dark-colored reaction product with above-described Lewis-acids, a neutral, i.e., gray to black substance. Such preferred chromogenic materials are eligible to be used in the preferred pressure sensitive record units and mark-forming units of this invention. It is understood that colors with respect to hue, saturation, and lightness are customarily identified in a largely subjective manner. Neutral "colors," i.e., shades which range from gray to black and which are substantially lacking in hue and saturation are also customarily identified in a subjective manner. An observer of the products resulting from reaction between preferred ones of the novel chromogenic materials of this invention and specified Lewis-acid reactive materials is immediately aware that such reaction products are substantially neutral in hue.

BRIEF DESCRIPTION OF THE DRAWING

The encapsulated solution is released on the event of rupture of the capsules in writing operations, as is shown in FIG. 2.

Figure 1:
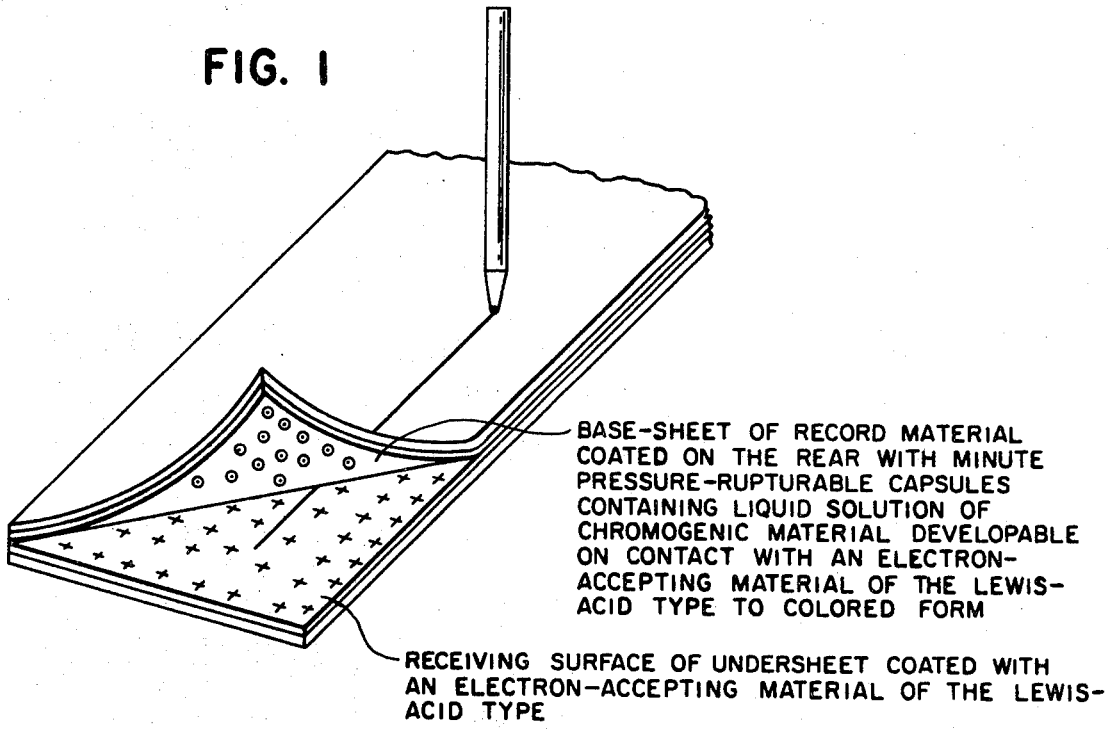
FIG. 1 is a diagrammatic representation of a two-sheet unit manifold, in perspective. The bottom surface of the overlying sheet is supplied on the surface or near the surface with a multiplicity of minute pressure-rupturable microcapsules containing a solution of the novel, substantially colorless, chromogenic component. An acidic component, such as an acid clay or a phenolic polymeric material lies within the lower web or undersheet or upon the upper surface of the lower web or undersheet. A colored mark is made by the use of a stylus, a type character, or other pressure-exerting means applied to the two-sheet unit manifold.
Figure 2:
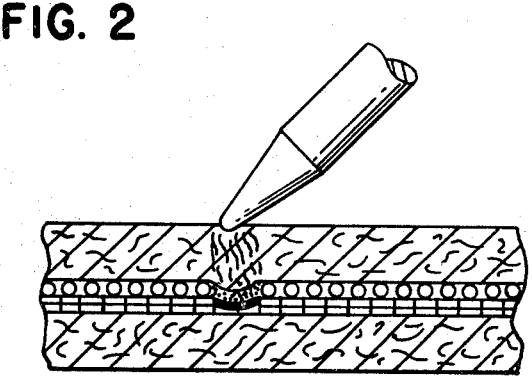
FIG. 2 is a sectioned view of the two-sheet unit manifold of FIG. 1. The elements are not to scale and are so-shown in order to more effectively depict their interrelation. The released solution is transferred from the overlying or base-sheet to the receiving surface of the underlying sheet in conformance with the pressure pattern of the writing operation. The drawing shows that the top of the underlying sheet is coated or impregnated with a material reactant with the chromogenic material, e.g., an acid clay or an acidic phenolic polymer material; and that capsules are present on the overlying or base-sheet which capsules contain a liquid solution of chromogenic material. In other embodiment of the record material, however, the capsules can contain the polymeric phenolic material in liquid solution and the receiving surface of the underlying sheet can be supplied with the chromogenic material. The improvement in the system resides in the chromogenic material, which chromogenic material is the novel substance of the instant invention.

Referring again to FIG. 1, comprising an overlying or base-sheet having the chromogenic material located within or upon the sheet; it is possible to incorporate the chromogenic material in a solid, crystalline state in a binder material so that the chromogenic material may be transferred from the overlying sheet, upon the application of pressure, to deposit some of the chromogenic material on the receiving surface of the undersheet, which receiving surface carries a color-activating polymeric material. Preferably, the chromogenic substance is dissolved in an appropriate solvent and minute droplets of the solution of the chromogenic material are encapsulated in minute, rupturable, capsules. It is apparent that many other arrangements are possible, including different configurations and relationships of the solvent and all of the mark-forming materials with respect to their encapsulation and location on the supporting underlying or overlying sheets or webs can be envisioned. Such arrangements are thoroughly described in the afore-mentioned application Ser. No. 392,404 in the names of Miller et al. and need not be repeated herein.

SUMMARY OF THE INVENTION

It is noted that the polymeric mark-forming components should have a common solubility with the novel chromogenic material in at least one liquid solvent when the acid-reacting material is a phenolic or other acidic organic polymer. It is also noted that in a single system several chromogenic materials may be used with the same or different polymeric materials. Several polymeric materials can be reactively contacted with a single chromogenic compound or with a mixture of chromogenic compounds.

As mentioned above, the solvent can be maintained in physical isolation in minute droplets until such time as it is released by application of pressure. This may be accomplished by several known techniques, but, preferably, isolation is maintained by encapsulation of individual droplets of the solvent in a microcapsule according to the procedures described, for example, in U.S. Pat. No. 2,712,507, issued July 5, 1955 on the application of Barrett K. Green; 2,730,457 issued Jan. 10, 1956 on the application of Barrett K. Green and Lowell Schleicher; 2,800,457, issued July 23, 1957 on the application of Barrett K. Green and Lowell Schleicher; 2,800,458, issued July 23, 1957 on the application of Barrett K. Green, reissued as Reissue Pat. No. 24,899 on Nov. 29, 1960; and 3,041,289 issued June 26, 1962 on the application of Bernard Katchen and Robert E. Miller. The microscopic capsules, when disposed within or upon a supporting web as a multiplicity in contiguous juxtaposition, are rupturable by pressure, such as normal marking pressure found, for example, in writing or typing operations.

The material or materials chosen as the wall material for the droplet-containing microcapsules, in addition to being pressure rupturable, must be inert or unreactive with respect to the intended contents of the capsules and the other mark-forming components so that the capsule wall material will remain intact under normal storage conditions until such time as it is released by an application of marking pressure. Preferred examples of eligible capsule wall materials include gelatin, gum arabic and many others thoroughly described in the aforementioned patents.

For most uses in record material, the capsule size should not exceed about 50 microns in diameter. Preferably, the capsules should be smaller than about 15 microns in diameter.

The acidic organic polymeric material useful for developing the color of novel chromogenic compounds in this invention include phenolic polymers, phenol acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinylmethylether-maleic anhydride copolymer and mixtures thereof.

More specifically, phenolic polymers found useful include alkyl-phenol acetylene resins, which are soluble in common organic solvents and possess permanent fusibility in the absence of being treated by cross-linking materials. Another specific group of useful phenolic polymers are members of the type commonly referred to as "Novolacs" (a type of phenol-formaldehyde polymeric material) which are characterized by solubility in common organic solvents and which are, in the absence of cross-linking agents, permanently fusible. Resol resins, if they are still soluble, may be used, though they are subject to change in properties upon aging. Generally, phenolic polymer material found useful in practicing this invention is characterized by the presence of hydroxyl groups and by the absence of groups such as methylol, which tend to promote infusibility or cross-linking of the polymer, and, further, by being soluble in organic solvents and relatively insoluble in aqueous media. Again, it should be remembered that mixtures of these organic polymers and other acidic materials can be employed.

A laboratory method useful in the selection of suitable phenolic resins is the determination of the infrared absorption pattern. It has been found that phenolic resins which undergo absorption in the 3200–3500 cm.$^{-1}$ region (which is indicative of hydroxyl groups) on the resin molecules and which do not absorb in the 1600–1700 cm.$^1$ region are eligible. This latter absorption region is indicative of desensitization of hydroxyl groups which densensitization renders such groups unavailable for reaction with the chromogenic materials.

The preparation of some organic polymeric materials useful for practicing this invention has been described in "Industrial and Engineering Chemistry, volume 43, pages 134 to 141, January 1951, and a particular polymer thereof is described in Example I of U.S. Pat. No. 2,052,093, issued to Herbert Hönel on Aug. 25, 1936. The preparation of the phenol-acetylene polymers has been described in "Industrial and Engineering Chemistry," volume 41, pages 73 to 77, January 1949. The preparation of maleic anhydride copolymers is described in the literature, such as, for example, one of the maleic anhydride vinyl copolymers, as disclosed in "Vinyl and Related Polymers," by Calvin E. Schildknecht, second printing, published April 1959, by John Wiley & Sons, Incorporated: See pages 65 to 68 (styrene-maleic anhydride copolymer), 530 to 531 (ethylene-maleic anhydride copolymer), and 628 to 630 (vinylmethylether-maleic anhydride copolymer).

When the acidic material used as a mark-forming component in the present invention is one of the aforementioned organic polymers, the liquid solvent chosen must be capable of dissolving it. The solvent may be volatile or nonvolatile, and a single- or multiple-component solvent may be used which is wholly or partially volatile. Exampes of volatile solvents useful in practicing the present invention include toluene, petroleum distillate, perchloroethylene, and xylene. Examples of nonvolatile solvents include high-boiling-point petroleum fractions and chlorinated biphenyls. Generally, the solvent chosen should be capable of dissolving at least about 0.3 percent, by weight, of the chromogenic material, and at least about 3 to 5 percent, by weight, of the acidic polymeric material to yield an effective reaction. However, in the preferred system, the solvent should be capable of dissolving an excess of the polymeric material, so as to provide every opportunity for utilization of the chromogenic material and, thus, to assure maximum coloration at the reaction site.

A further criterion for selection of the solvent is that the solvent must not interfere with the mark-forming reaction. In some instances, the presence of the solvent may be found to interfere with the mark-forming reaction or diminish the intensity of the mark, in which instances the solvent chosen should be sufficiently volatile to assure its removal from the reaction site soon after having brought the mark-forming components into reactive contact so that the mark-forming reaction can proceed.

Since the mark-forming reaction requires that an intimate mixture of the components be brought about through solution of said components, one or more of the mark-forming components can be dissolved in solvent droplets isolated by encapsulation, the only requirement being that at least one of the components essential to the mark-forming reaction be maintained isolated until the mark-forming reaction is desired.

In the usual case, the mark-forming components are so chosen as to produce a mark upon application of pressure to a coated system of sheets at room temperature (20 to 25 degrees centigrade). However, the present invention also includes a system wherein the solvent component is not liquid at temperatures near room temperature but is liquid and in condition for forming solutions only at elevated temperatures.

The support sheet member on which components of the system are disposed may comprise a single or a dual sheet assembly. In the case where all components are disposed on a single sheet, the record material is referred to as a "self-contained" or autogenous system. Where there must be a migration of solvent, with or without the mark-forming component, from one sheet to another, the record material is referred to as a "transfer" system. (Such a system may also be referred to as a "two-fold" system, in that at least two sheets are required and each sheet includes a component, or components, essential to the mark-forming reaction.) Where an adequate amount of the colored reaction product is produced in liquid or dissolved form on a surface of one sheet, a colored mark can be recorded on a second sheet by transfer of the colored reaction product.

In a preferred case, where microcapsules are employed, they can be present in the sheet support material either disposed therethroughout or as a coating thereon, or both. The capsules can be applied to the sheet material as a dispersion in the liquid vehicle in which they were manufactured, or, if desired, they can be separated from the vehicle and thereafter dispersed in a solution of the acid-reacting polymeric component (for instance, 30 grams of water and 53 grams of a 1 percent, by weight, aqueous solution of polyvinylmethylether-maleic anhydride) to form a sheet-coating composition in which, because of the inertness of the solution and the capsules, both components retain their identity and physical integrity. When this composition is disposed as a film on the support material and dried, the capsules are held therein subject to release of the contained liquid by rupture of the capsule walls. The latter technique, relying on the inertness of the microcapsule and the dispersing medium of the film-forming mark-forming polymeric component, provides a method for preparing a sensitive record material coating having the capsules interspersed directly in a dry film of the polymeric material as the film is laid down from solution. A further alternative is to disperse one or more mark-forming components, and the chromogenic-material-containing microcapsules in a liquid medium not a solvent for either the mark-forming component or the microcapsules, with the result that all components of the mark-forming system may be disposed on or within the support sheet in the one operation. Of course, the several components may be applied individually. The capsules can also be coated onto a sheet as a dispersion in a solution of polymeric material which is not necessarily reactive with the capsule-contained solution of chromogenic materials.

The respective amounts of the several components can be varied according to the nature of the materials and the architecture of the record material unit desired or required. Suitable lower amounts include, in the case of the chromogenic material, about 0.005 to 0.075 pound per ream (a ream in this application meaning five hundred (500) sheets of 25" x 38" paper, totalling 3,300 square feet); in the case of the solvent, about 1 to 3 pounds per ream; and in the case of the polymer, about 0.5 pound per ream. In all instances, the upper limit is primarily a matter of economic consideration.

The slurry of capsules can be applied to a "wet" web of paper, for example, as it exists on the screen of a Fourdrinier paper machine, so as to penetrate the paper web a distance depending on the freeness of the pulp and the water content of the web at the point of application. The capsules can be placed directly in or on a paper or support sheet. Not only capsule structures, but continuous films which contain a multitude of microscopic, unencapsulated, droplets for local release in an area subjected to pressure can be utilized. (See, for example, U.S. Pat.

No. 2,299,694 which issued Oct. 20, 1942, on the application of Barrett K. Green.)

With respect to the acidic organic polymeric component, a solution thereof in an evaporable solvent can be introduced into an amount of water and the resulting mixture can be agitated while the evaporable solvent is blown off by an air blast. This operation leaves an aqueous colloidal dispersion slurry of the polymeric material, which may be applied to finished paper so as to leave a surface residue, or the slurry may be applied to a "wet" web of paper or at the size-press station of a papermaking machine. In another method for making a polymer-sensitized sheet, the water-insoluble polymer can be ground to a desired or required particle size in a ball mill with water, preferably with a dispersing agent, such as a small quantity of sodium silicate. If a binder material of hydrophilic properties is ground with the polymeric material, the binder itself may act as a dispersant. If desired, an amount of binder material of up to 40 percent, by weight, of the amount of polymeric material can be added to the ball-milled slurry of materials—such binder materials being of the paper coating binder class, including, for example, gum arabic, casein, hydroxyethylcellulose, and latexes (such as styrene-butadiene copolymer). If desired, oil absorbents in the form of fuller's earths may be combined with the polymeric material particles to assist in retaining, in situ, the liquid droplets of chromogenic material solution to be transferred to it in data-representing configuration, for the purpose of preventing "bleeding" of the print.

Another method for applying the chromogenic or polymeric material individually to a single sheet of paper is by immersing a sheet of paper in 1–10 percent, by weight, solution of the material in an evaporable solvent. Of course, this operation must be conducted individually for each reactant, because if the other reactant material were present, contact of the reactants would result in a premature coloration over the sheet area. A dried sheet with one component can then be coated with a solution of another component, the solvent of which is a non-solvent to the already-supplied component.

The polymeric material can also be dissolved in ink composition vehicles to form a printing "ink" of colorless character and, thus, may be used to spot-print a proposed record-sheet-unit sensitized for recording, in a reaction-produced color in those spot-printed areas, by application of a solution of the chromogenic material. In the case of phenolic polymer, a printing ink may be made of up to 75 percent, by weight, of the phenolic polymeric material in a petroleum-based solvent—the ink being built to a viscosity suitable for printing purposes. The relative amounts of reactive, mark-forming, components to be used in practice of this invention, are those most convenient and economical amounts consistent with adequate, desired or required visibility of the recorded data. The resolution of the recorded data is dependent on, among other things, particle or capsule size, distribution and amount of particles or capsules, liquid solvent migration, chemical reaction efficiency, and other factors, all of which can be optimized empirically by one skilled in the art. Such factors do not determine the principle of the present invention, which invention, in part, relates to means for enabling the bringing into solution contact, by marking pressure, two normally solid, chemically reactive, components dissolved in a common liquid solvent component held isolated as liquid droplets. The isolated liquid droplets are preferably in marking-pressure-rupturable capsules having polymeric-film walls, or are isolated, as a discontinuous phase, in a continuous marking-pressure-rupturable film.

In the color system of this invention the acidic mark-forming material reacts with the novel chromogenic material to effect distinctive color formation or color change. In a multi-sheet system in which an acidic organic polymer is employed, it may be desirable to include other materials to supplement the polymer reactants. For example, kaolin can be added to improve the transfer of the liquid and/or the dissolved materials between the sheets. In addition, other materials such as bentonite, attapulgite, talc, feldspar, halloysite, magnesium trisilicate, silica gel, pyrophyllite, zinc sulfate, calcium sulfate, calcium citrate, calcium phosphate, calcium fluoride, barium sulfate and tannic acid can be included.

Various methods known to the prior art and others disclosed in the aforementioned application S.N. 392,404 in the names of Miller et al. and in U.S. patent application S.N. 420,193 in the names of Phillips et al., now U.S. Pat. No. 3,455,721 can be employed in compositions useful for coating mark-forming materials into supporting sheets. An example of the compositions which can be coated onto the receiving surface of an underlying sheet of a multi-sheet to react with a capsule coating on the underside of an overlying sheet is as follows:

| Coating composition: | Percent by wt. |
|---|---|
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

Having disclosed, generally, the novel chromogenic materials of this invention and preferred methods for utilizing the novel chromogenic materials, in combination with other materials, as reactive components in mark-forming record material; examples will now be disclosed wherein preparation of several of the novel chromogenic materials is described.

EXAMPLE 1

Preparation of 5-(p-dimethylaminobenzylidene)amino-3-(p-dimethylaminophenyl) - 3 - (1,2-dimethylindol-3-yl) phthalide 26.6 grams of aluminum chloride were added to an ice bath-chilled, agitating, mixture of 19.0 grams of 4-nitrophthalic anhydride, 13.3 grams of dimethylaniline, and 40 milliliters of benzene over a duration of about 5 minutes. The ice-bath was removed and agitation was continued for about two hours. To the reaction mixture were very slowly added 30 milliliters of water and 200 milliliters of 3-normal aqueous hydrochloric acid. On addition of the acid, an oily material separated from the reaction mixture and was decanted and stirred with 300 milliliters of 5-normal aqueous ammonium hydroxide. The ammonium hydroxide-oil system was filtered to remove some precipitated solids and the pH of the filtrate was lowered, in a stepwise fashion, to precipitate the product of reaction. Material which precipitated between pH 5 and pH 2 was isolated and amounted to 5.1 grams. The material so-isolated was 2-carboxy-4'-dimethylamino-4 (and 5)-nitrobenzophenone.

The above benzophenone was used to prepare an aminophthalide material intermediate to the title aminophthalide-Schiff base material of this example, in the following manner: 0.94 gram of the above benzophenone, 0.45 gram of 1,2-dimethylindole, and 10 milliliters of acetic anhydride were heated to 55–60 degrees centigrade for about one hour and the mixture was mixed with 100 milliliters of water. The pH of the system was raised to above 8 and the system was extracted with benzene. About 0.5 gram of 3-(p-dimethylaminophenyl)-3-(1,2-dimethylindol-3-yl)-5 (and 6)-nitrophthalide was isolated. The nitrophthalide material was reduced by contact with stannous chloride reducing solution to yield aminophthalide material. The two phthalides, that is, 5-amino-3-(p-dimethylaminophenyl) - 3 - (1,2 - dimethylindol - 3 - yl) phthalide and 6 - amino - 3 - (p-dimethylaminophenyl)-3-(1,2-dimethylindol-3-yl)phthalide, exhibit different solubilities in benzene and the two compounds were thereby separated. Further purification could be performed using activated alumina in a chromatography column.

6-amino - 3 - (p - dimethylaminophenyl)-3-(1,2-dimethylindol-3-yl)phthalide, one of the intermediate materials, was reacted with p-dimethylaminobenzaldehyde by heating the two materials together at about 90 degrees centigrade for about 30 minutes. The reaction mixture was cooled and dissolved in a small amount of benzene and the reaction product was precipitated using low boiling point petroleum ether. A benzene solution of the product imparted a green color to paper coated with a mixture of kaolin and phenolic resin.

EXAMPLE 2

Preparation of 6-(p-dimethylaminobenzylidene)amino-3-(p - dimethylaminophenyl) - 3 - (1,2 - dimethylindol-3-yl)phthalide The title compound was prepared according to the procedure and using the materials of Example 1, above, with the exception that 6-amino-3-(p-dimethylaminophenyl)-3-(1,2-dimethylindol-3-yl)phthalide from the first part of the Example 1 preparation was utilized rather than the 5-aminophthalide compound used in Example 1. A benzene solution of the product imparted a bluish gray color to paper coated with a mixture of kaolin and phenolic resin.

EXAMPLE 3

Preparation of 6-(benzylidene)amino-3-(p-dimethylaminophenyl)-3-(1,2-dimethylindol-3-yl)phthalide The title compound was prepared according to the procedure and using the materials of Example 1, above, with the exception that benzaldehyde was substituted for the p-dimethylaminobenzaldehyde of Example 1. A benzene solution of the product imparted a blue color to paper coated with a mixture of kaolin and phenolic resin.

EXAMPLE 4

Preparation of 3-(p-dimethylaminophenyl)-6-(3-indolylmethylene)amino-3-(1,2-dimethylindol-3-yl)phthalide The title compound was prepared according to the procedure and using the materials of Example 2, above, with the exception that indole-3-carboxaldehyde was substituted for the p-dimethylaminobenzaldehyde of Example 2. A benzene solution of the product imparted a purplish-blue color to paper coated with a mixture of kaolin and phenolic resin.

EXAMPLE 5

Preparation of 3-(p-dimethylaminophenyl)-3-(1,2-dimethylindol-3-yl)-6-(1-naphthylmethylene)aminophthalide The title compound was prepared according to the procedure and using the materials of Example 2, above, with the exception that 1-naphthaldehyde was substituted for the p-dimethylaminobenzaldehyde of Example 2. A benzene solution of the product imparted a blue color to paper coated with a mixture of kaolin and phenolic resin.

EXAMPLE 6

Preparation of 6 - (cinnamylidene)amino-3-(p-dimethylaminophenyl)-3-(1,2-dimethylindol-3-yl)phthalide The title compound was prepared according to the procedure and using the materials of Example 2, above, with the exception that cinnamaldehyde was substituted for the p-dimethylaminobenzaldehyde of Example 2. A benzene solution of the product imparted a blue color to paper coated with a mixture of kaolin and phenolic resin.

EXAMPLE 7

Preparation of 5 - (p - dimethylaminobenzylidene)amino-3,3-bis(p-dimethylaminophenyl)phthalide The title compound was prepared according to the procedure and using the materials of Example 1, above, with the exception that dimethylaniline was substituted for 1,2-dimethylindole in preparation of the aminophthalide intermediate. The 5-amino-3,3-bis(p-dimethylaminophenyl)phthalide intermediate compound was reacted with p-dimethylaminobenzaldehyde according to the procedure of Example 1. A benzene solution of the product imparted a yellowish-green color to paper coated with a mixture of kaolin and phenolic resin.

EXAMPLE 8

Prepartion of 6-(p-dimethylaminobenzylidene)amino-3,3-bis(p-dimethylaminophenyl)phthalide The title compound was prepared according to the procedures and using the materials of Example 7, above, with the exception that 6-amino-3,3-bis(p-dimethylaminophenyl)phthalide was substituted for the 5-aminophthalide used in Example 7. Separation of the 5-aminophthalide compound from the 6-aminophthalide compound has been discussed in Example 2, above. A benzene solution of the title compound of this example imparted a greenish-gray color to paper coated with a mixture of kaolin and phenolic resin.

EXAMPLE 9

Preparation of 6-(benzylidene)amino-3,3-bis(p-dimethylaminophenyl)phthalide

The title compound was prepared according to the procedure and using the materials of Example 8, above, with the exception that benzaldehyde was substituted for the p-dimethylaminobenzaldehyde of Example 8. A benzene solution of the product imparted a blue color to paper coated with a mixture of kaolin and phenolic resin.

EXAMPLE 10

Prepartion of 3,3-bis(p-dimethylaminophenyl)-6-[(1,3,3-trimethyl-2-indolinylidene)-ethylideneamino]phthalide The title compound was prepared according to the procedure and using the materials of Example 8, above, with the exception that 1,3,3-trimethyl-2-indolidenylacetaldehyde was substituted for the p-dimethylaminobenzaldehyde of Example 8. A benzene solution of the product imparted a green color to paper coated with a mixture of kaolin and phenolic resin.

What is claimed is:

1. A pressure-sensitive record unit comprising:
   (a) support web or sheet material,
   (b) mark-forming components and a releasable liquid solvent for said mark-forming components arranged in contiguous juxtaposition and supported by said sheet material,
   (c) said mark-forming components comprising at least one chromogenic material of the structure:

wherein:
R represents a chemical radical selected from the group consisting of

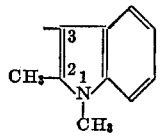

and

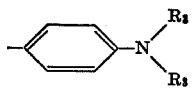

wherein $R_3$ represents a chemical radical selected from the group consisting of —H and alkyl radicals having less than five carbon atoms;
$R_1$ represents a chemical radical selected from the group consisting of

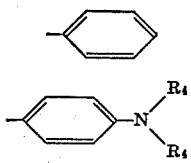

wherein $R_4$ represents a chemical radical selected from the group consisting of —H and alkyl radicals having less than five carbon atoms

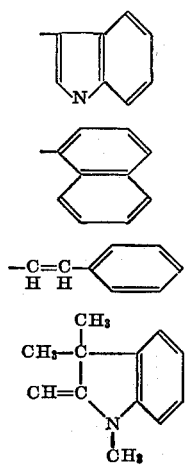

and $R_2$ represents a chemical radical selected from the group consisting of —H and alkyl radicals having less than five carbon atoms;
and an electron-accepting material of the Lewis acid type reactive with said chromogenic material to produce a mark; which components upon pressure-release of the liquid solvent are brought into reactive contact in the released solvent.

2. The record unit of claim 1 wherein at least one of the mark-forming components is maintained in isolation from the other mark-forming components prior to the release of the solvent.

3. The record unit of claim 1 wherein the liquid solvent is present as the nucleus of a microcapsule.

4. The record unit of claim 1 wherein the chromogenic material is dissolved in the liquid solvent prior to pressure release.

5. The record unit of claim 1 wherein the mark-forming components and the liquid solvent are present in a single support sheet.

6. The record unit of claim 1 wherein at least one member selected from the group consisting of the mark-forming components and the liquid solvent is present in a support sheet other than the support sheet having the remaining members of the group.

7. The record unit of claim 1 where the electron-accepting material of the Lewis acid type comprises a clay.

8. The record unit of claim 1 where the electron-accepting material of the Lewis acid type comprises at least one organic polymer.

9. The record unit of claim 8 where the organic polymer is a phenolic polymer.

10. The record unit of claim 9 wherein the mark produced by reactive contact between the phenolic polymer and the chromogenic material is substantially neutral in color and wherein the chromogenic material is at least one material selected from the group of materials consisting of:
6-(p-dimethylaminobenzylidene)amino-3-(p-dimethylaminophenyl)-3-(1,2-dimethylindol-3-yl)phthalide;
6-(cinnamylidene)amino-3-(p-dimethylaminophenyl)-3-(1,2-dimethylindol-3-yl)phthalide;
3-(p-dimethylaminophenyl)-3-(1,2-dimethylindol-3-yl)-6-(1-naphthylmethylene)aminophthalide;
6-(benzylidene)amino-3-(p-dimethylaminophenyl)-3-(1,2-dimethylindol-3-yl)phthalide; and
6-(p-dimethylaminobenzylidene)amino-3,3-bis(p-dimethylaminophenyl)phthalide.

11. A mark-forming unit, comprising: a first web or sheet having on one surface a transfer coating which contains as a finely dispersed phase a plurality of minute, pressure-rupturable capsules containing as an inner phase a solvent vehicle; a second web or sheet having an adherent coating upon its surface or dispersed within said web or sheet, said first and second webs or sheets being maintained disposed together in face-to-face relationship with said respective transfer and adherent coatings in contiguity with each other; a first coating constituent in the form of a substantially colorless or slightly colored chromogenic material which includes as a major functional arrangement the molecular structure

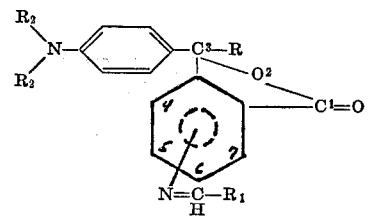

wherein:
R represents a chemical radical selected from the group consisting of:

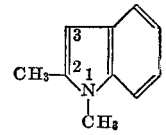

and

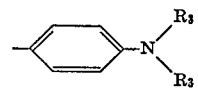

wherein $R_3$ represents a chemical radical selected from the group consisting of —H and alkyl radicals having less than five carbon atoms;
$R_1$ represents a chemical radical selected from the group consisting of

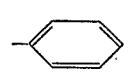 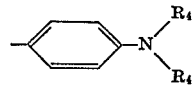

wherein $R_4$ represents a chemical radical selected from the group consisting of —H and alkyl radicals having less than five carbon atoms,

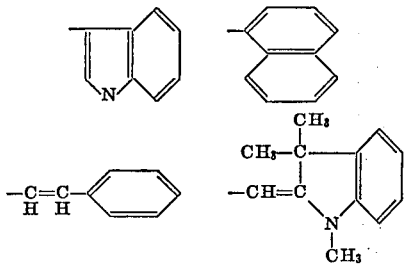

and $R_2$ represents a chemical radical selected from the group consisting of —H and alkyl radicals having less than five carbon atoms;

and a second constituent in the form of an electron-accepting material of the Lewis acid type; one of said constituents being dissolved in said solvent liquid vehicle present as the inner phase of the plurality of minute pressure-rupturable capsules in the transfercoating on or within said first web or sheet, and the other of said coating constituents being bonded to said second web in said adherent coating thereon but being accessible to other materials coming into contact with portions of the adherent coating, whereby, upon local impact and rupture of said capsules, releasing said liquid vehicle containing one coating constituent from at least some of the capsules onto said contiguous adherent coating, reactive contact is effected between said two constituents to produce a dark-colored material by the action of said electron-accepting material of the Lewis acid type upon said chromogenic material to effect color change in said chromogenic compound to said dark-colored material.

12. The mark-forming unit of claim 11 in which the electron-accepting material of the Lewis acid type comprises a clay.

13. The mark-forming unit of claim 11 in which the electron-accepting material of the Lewis acid type comprises an organic polymer.

14. The mark-forming unit of claim 13 in which the organic polymer is a phenolic polymer.

15. The mark-forming unit of claim 14 wherein the mark produced by reactive contact between the phenolic polymer and the chromogenic material is substantially neutral in color and wherein the chromogenic material is at least one material selected from the group of materials consisting of:

6-(p-dimethylaminobenzylidene)amino-3-(p-dimethylaminophenyl)-3-(1,2-dimethylindol-3-yl)phthalide;
6-(cinnamylidene)amino-3-(p-dimethylaminophenyl)-3-(1,2-dimethylindol-3-yl)phthalide;
3-(p-dimethylaminophenyl)-3-(1,2-dimethylindol-3-yl)-6-(1-naphthylmethylene)aminophthalide;
6-(benzylidene)amino-3-(p-dimethylaminophenyl)-3-(1,2-dimethylindol-3-yl)phthalide; and
6-(p-dimethylaminobenzylidene)amino-3,3-bis(p-dimethylaminophenyl)phthalide.

References Cited

UNITED STATES PATENTS

| | | | |
|---|---|---|---|
| 2,550,471 | 4/1951 | Green et al. | 282—28 |
| 3,491,116 | 1/1970 | Lin | 260—326.14 |
| 3,509,174 | 4/1970 | Lin | 260—326.14 |
| 3,594,369 | 7/1971 | Lin et al. | 117—36.2 |

MURRAY KATZ, Primary Examiner

U.S. Cl. X.R.

106—14.5; 117—155 UA, L; 260—240 G, 240.1